(12) United States Patent
Vezzani (10) Patent No.: US 9,856,040 B2
(45) Date of Patent: Jan. 2, 2018

(54) PASTA DOSING MACHINE, PARTICULARLY FOR LONG-TYPE PASTA

(71) Applicant: Giuseppe Vezzani, Lugano (CH)

(72) Inventor: Giuseppe Vezzani, Lugano (CH)

(73) Assignee: CYBORGLINE SA, Paradiso-Lugano (CH)

( * ) Notice: Subject to any disclaimer, the term of this patent is extended or adjusted under 35 U.S.C. 154(b) by 0 days.

(21) Appl. No.: 15/310,322

(22) PCT Filed: May 14, 2014

(86) PCT No.: PCT/IB2014/061423
§ 371 (c)(1),
(2) Date: Nov. 10, 2016

(87) PCT Pub. No.: WO2015/044796
PCT Pub. Date: Apr. 2, 2015

(65) Prior Publication Data
US 2017/0174370 A1 Jun. 22, 2017

(51) Int. Cl.
*B65B 1/06* (2006.01)
*B65B 1/34* (2006.01)
(Continued)

(52) U.S. Cl.
CPC .................. *B65B 1/32* (2013.01); *B65B 1/06* (2013.01); *B65B 1/08* (2013.01); *B65B 19/34* (2013.01);
(Continued)

(58) Field of Classification Search
CPC .... B65B 1/32; B65B 1/06; B65B 1/08; B65B 19/34; G01G 13/00; G01G 13/003;
(Continued)

(56) References Cited

U.S. PATENT DOCUMENTS 3,209,844 A * 10/1965 Stambera ............... G01G 13/00
177/120
3,404,742 A * 10/1968 Bonneric ............... G01G 13/00
141/107
(Continued)

FOREIGN PATENT DOCUMENTS

EP 0 519 566 A1 12/1992
EP 1 129 948 A1 9/2001
(Continued)

OTHER PUBLICATIONS

International Search Report, dated Oct. 1, 2014 (6 pages).
(Continued)

*Primary Examiner* — Randy Gibson
(74) *Attorney, Agent, or Firm* — Jacobson Holman, PLLC.

(57) ABSTRACT

A pasta dosing machine is described, comprising at least one channel for roughing the pasta, provided with first dosing means, a first basket for collecting the dosed pasta and a device adapted to weigh the pasta collected in said first basket, at least one channel for finishing the pasta, provided with second dosing means, and a further basket for collecting the pasta unloaded from said first basket and from said finishing channel, and a further device adapted to weigh the pasta collected in said further basket.

4 Claims, 15 Drawing Sheets

(51) Int. Cl.
*G01G 13/04* (2006.01)
*G01G 23/00* (2006.01)
*B65B 1/32* (2006.01)
*B65B 19/34* (2006.01)
*B65B 1/08* (2006.01)
*G01G 13/00* (2006.01)
*G01G 13/06* (2006.01)

(52) U.S. Cl.
CPC ............. *G01G 13/00* (2013.01); *G01G 13/04* (2013.01); *G01G 13/06* (2013.01); *G01G 13/003* (2013.01); *G01G 23/00* (2013.01)

(58) Field of Classification Search
CPC ........ G01G 23/00; G01G 13/04; G01G 13/06; G01G 13/08
See application file for complete search history.

(56) References Cited

U.S. PATENT DOCUMENTS 4,531,597 A * 7/1985 Focke ....................... B65B 1/32
                                                         177/123
6,111,206 A * 8/2000 Maguire ................. G01F 11/18
                                                         177/116
6,386,391 B2 * 5/2002 Vezzani ................. B65B 37/20
                                                         222/196
2002/0144748 A1 10/2002 Price et al.
2008/0283070 A1 * 11/2008 Jacobi ....................... B65B 1/32
                                                         131/286

FOREIGN PATENT DOCUMENTS

JP     2010-230621 A    10/2010
WO     2008/012139 A1    1/2008

OTHER PUBLICATIONS

Written Opinion of the International Searching Authority, dated Oct. 1, 2014 (8 pages).

International Preliminary Report on Patentability, dated Apr. 7, 2015 (18 pages).

* cited by examiner

PASTA DOSING MACHINE, PARTICULARLY FOR LONG-TYPE PASTA

BACKGROUND OF THE INVENTION

The present invention relates to a pasta dosing machine, particularly for long-type pasta.

Industrial machines adapted to package pasta are generally known. Obviously, before being packaged, the pasta is to be conveniently weighed by means of dosing machines so as to establish and control the amount provided for packaging.

Said dosing machines are generally provided with roughing and finishing channels in which dosing blades are transversally inserted, setting the amount of pasta to be dispensed to the packaging machine each time.

A suitable basket is placed under the roughing channel and is provided with a weight measurer for weighing the pasta contained in the basket itself. Upon weighing, the weight measurer emits an electronic signal corresponding to weighing being completed, which conveniently drives the fine dosing device, associated with the finishing channel, to release a given amount of pasta. Such an amount is a function of the weighing value taken by the measurer and is adapted to be added to the pasta dosed by the roughing channel so as to obtain the desired dose of pasta to be sent for successive packaging.

Nevertheless, said known dosing machines have some degrees of uncertainty which may give rise to packages with doses not exactly corresponding to the desired amount of pasta.

Furthermore, in detail, the dosing of the pasta contained in the roughing channel is performed by a rotor with a radial recess, which is rotatable about an axis defined by a shaft which is integral with a pulley. Said radial rotor recess is adapted to contain the dose of pasta previously dosed by the blade and, upon a rotation of 180°, to transfer it into the basket connected to the weight measurer.

Such a configuration of weight measurers may however not be optimal in terms of process times which today are required to be shorter and shorter.

U.S. Pat. No. 3,209,844 A discloses a dosing machine for pasta which comprises the features recited in the preamble of claim 1.

EP 0519 566 A1 discloses a packaging machine provided with weighing pans.

US 2002/144748A1 discloses a volumetric pocket filler in which a drawer is arranged below a bottom opening and is configured to slide horizontally and to take a first position for collecting the pasta from the hopper into a passage and a second position for transferring the pasta from said passage to a compartment provided with an openable base.

BRIEF SUMMARY OF THE INVENTION

In view of the state of the art described, it is the object of the present invention to provide a pasta dosing machine for long-type pasta to overcome the aforesaid drawbacks.

In accordance with the present invention, such an object is achieved by a pasta dosing machine as defined in claim 1.

Thereby, the distance is reduced between the unloading axis of the final weighing basket and the axis of the conveyor belt which usually receives and supports the doses of pasta dispensed by the dosing machine each time.

BRIEF DESCRIPTION OF THE DRAWINGS

The features and advantages of the present invention will become apparent from the following detailed description of a practical embodiment thereof, shown by way of non-limiting example in the accompanying drawings, in which.

DETAILED DESCRIPTION OF THE INVENTION

Figure 1:
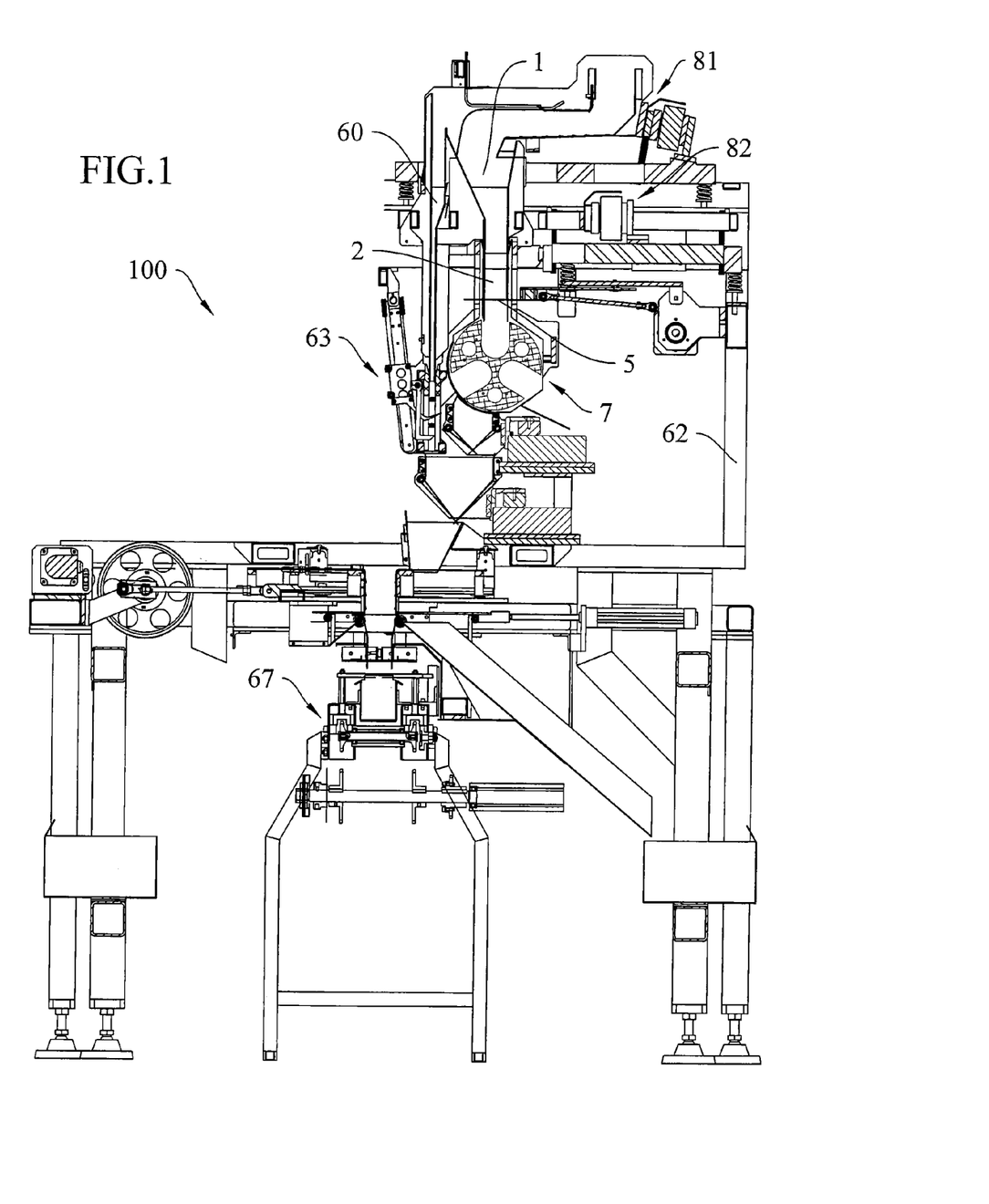
FIG. 1 shows a partially sectioned front view of a pasta dosing machine according to a first embodiment of the present invention.

With reference to FIG. 1, there is shown a first embodiment of a dosing machine 100 according to the present invention, provided with a fixed frame 62. The product in said dosing machine 100, i.e. long-type pasta such as spaghetti, is introduced perpendicular to the drawing plane, through a mouth 1 into a roughing channel 2 and into a finishing channel 60 by means of oscillations due to a vibrating device 81 arranged on the upper part of machine 100.

The roughing channel 2 is a descent channel for the product to be roughed and is connected to a second vibrating device 82 to facilitate the descent of the pasta into the channel. The finishing channel 60 with its fine dosing device 63 is arranged beside the roughing channel 2.

Figure 2:
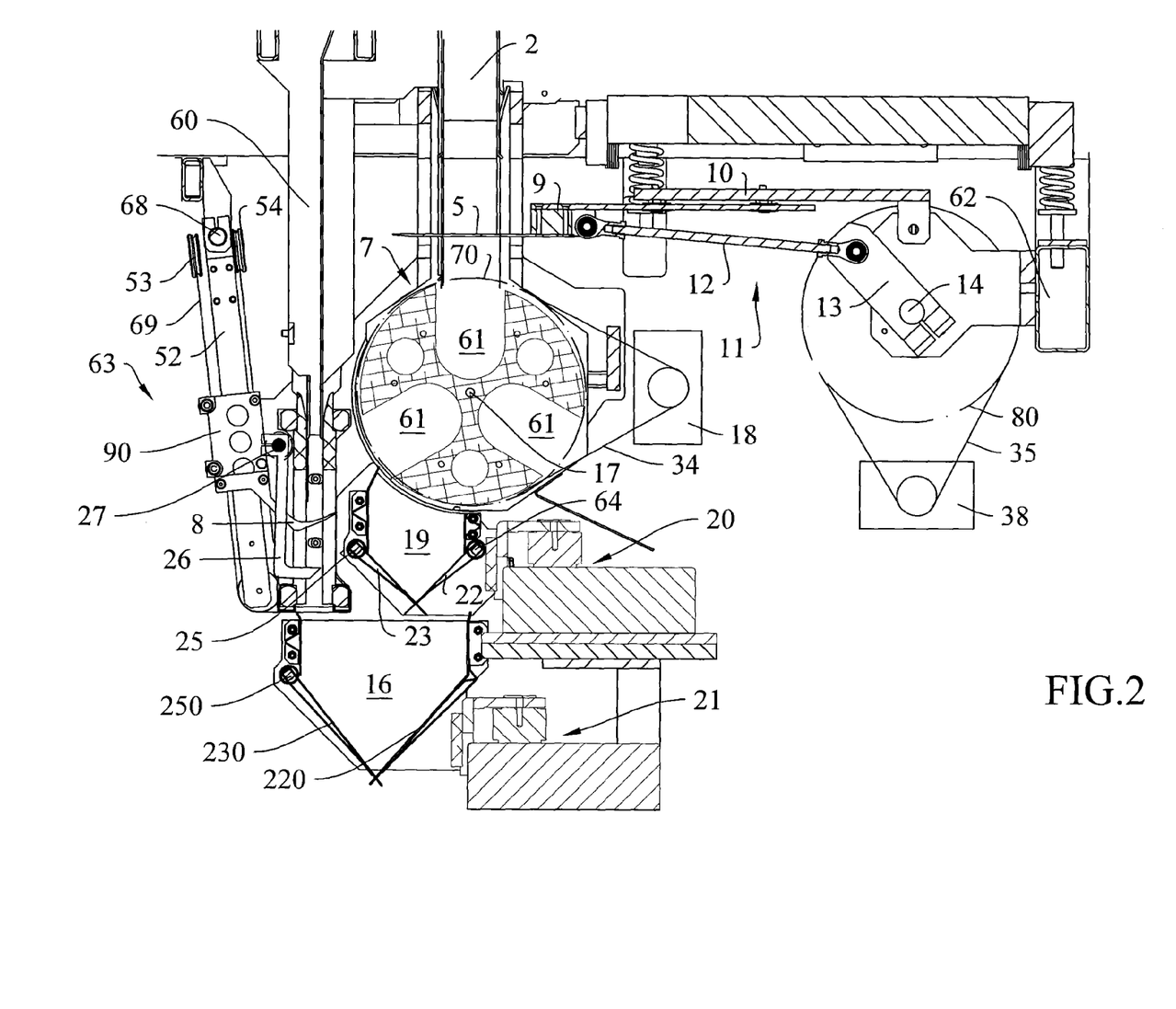
FIG. 2 shows a detail of the pasta dosing machine in FIG. 1.

The pasta that flows into channel 2 undergoes a dosing operation performed by a specific dosing device consisting of an horizontally movable blade 5. Blade 5 (FIG. 2) is connected to a horizontally movable body 9 along a horizontal guide 10 connected to the frame 62 of the machine, and can be tilted by means of a first motor 38 of the brushless type supported by the frame 62 itself. Body 9 is moved horizontally by means of a suitable linkage 11 comprising a first arm 12 hinged at one end to body 9, and at the other end to a lever 13, said lever 13 having the other end hinged to a pin 14 carried by the frame 62 of machine 100. Lever 13 is configured to rotate due to the operation of the brushless motor 38 with suitable reducer connected directly aligned to the shaft to which lever 13 is secured.

Located under the roughing channel 2 is a rotor 7 comprising a plurality of radial recesses 61 and rotatable about an axis defined by a shaft 17 orthogonal to the sheet in FIG. 1 and integral with a pulley 70. Said rotor 7 rotates due to the operation of pulley 70, which is connected to a second brushless motor 18, the motion of which is synchronized with said first brushless motor 38, by means of a belt 34. This synchronism is such to allow blade 5 to transversally enter channel 2 when there is a recess 61 which its concavity facing upwards at the outlet of channel 2 (pasta collection position) and, vice versa, to allow blade 5 to leave channel 2 transversally when there is no recess 61 which its concavity facing upwards at the outlet of channel 2 (pasta support position).

Arranged under rotor 7 is a basket 19 connected to a weight measurer 20 adapted to weigh the pasta. Basket 19 consists of structure comprising a hollow parallelepiped, which is closed at the bottom by two doors 22, 23, the first of which is hinged at 64 on the lower part of a side of the parallelepiped, while the second is pivotally hinged at 25 on the opposite side of the parallelepiped. A suitable linkage (not shown in the figure) operated by a third stepper motor opens basket 19 and more precisely rotates both door 22 and door 23 downwards; while elastic return means close the basket by rotating doors 22, 23 upwards.

On the other hand, the pasta flowing into the finishing channel 60 undergoes a dosing operation by means of a fine dosing mechanism 63 comprising a blade 8, which can be transversally inserted into the finishing channel 60 and is connected to a carriage 90 which moves vertically on an arm 52 hinged pivotally at 68 to frame 62 of the dosing machine 100. Carriage 90 (FIG. 2) is connected to a fourth motor (not shown) by means of a belt 69, which motor vertically moves the carriage 90 itself by means of two pulleys 53, 54, while a fifth motor (not shown) provides for the motion according to an arc of a circle of arm 52 by means of a suitable linkage. An L-shaped blade 26 adapted to support the pasta in the finishing channel 60 and transversally insertable therein, is hinged pivotally at 27 to frame 62 of the dosing machine 100 and is integrally associated with a lever (not shown in the figure) adapted to the motion thereof. The dosing blade 8 is configured to be transversally inserted into the finishing channel 60 by means of moving arm 52 rightwards due to the operation of said fifth motor; arm 52 describes a very small arc of a circle such that said movement can be substantially considered horizontal. Said blade 8 and said L-shaped blade 26 work in a substantially alternating manner: when arm 52 moves rightwards and the dosing blade 8 is transversally inserted into the finishing channel 60, the L-shaped blade 26 is configured to move leftwards thus being released from the finishing channel 60. Vice versa, when arm 52 moves leftwards and the dosing blade 8 is released from the finishing channel 60, the L-shaped blade 26 is configured to move rightwards thus being transversally inserted into the finishing channel 60.

Arranged under basket 19 (FIG. 2) is a further basket 16 connected to a further weight measurer 20 adapted to weigh the sum of the pasta received from basket 19 and of the pasta from the finishing channel 60. Basket 16 also consists of a structure comprising a hollow parallelepiped which is closed at the bottom by two doors 230, 220, the first of which is hinged at 250 on the lower part of a side of the parallelepiped, while the second is fixed. A suitable linkage (not shown in the figure) operated by a sixth brushless motor opens basket 16 and more precisely rotates door 230 downwards, while elastic return means close basket 16 by means of the upwards rotation of door 230.

A hopper 33 FIG. 8-FIG. 11 is positioned under basket 16 for the outlet of the pasta from the dosing machine 100. Said hopper 33 comprises a bottom opening 57 which may communicate with a passage 58 of a drawer 80 configured to slide horizontally along a lane and to take a first position for collecting the pasta from hopper 33 and a second position for transferring the pasta received into a compartment 59 provided with an openable base 65. The travel between the axis in the collection position and the axis in the pasta transfer position is advantageously short; for example, the lane is 100 mm in length.

Drawer 80 is not provided with a bottom, so that a plate 73 acts as support surface for the dose of pasta received from hopper 33 during the conveyance thereof towards compartment 59. Said plate 73 is operated by suitable movement means and is configured to translate horizontally in order to make an inlet 71 accessible, which is opposite to the lower opening of hopper 33, of an unloading channel 66 adapted to receive the pasta the dose of which has an undesired amount or, alternatively, in order to form a support surface for the pasta contained in drawer 58 if the weighing value is correct.

The openable base 65 of compartment 59 comprises a pair of comb-like elements configured so as to approach each other with the respective teeth mutually inserted, in a first closed configuration, and so as to move away from each other with the respective teeth not inserted, in a second open configuration.

The openable base 65 allows the pasta to fall vertically onto a conveyor belt 67 (FIG. 10-FIG. 13) which supports a sequence of compartments 68 each adapted to receive a dose of pasta for the following steps of packaging.

It is easily understood how the arrangement of the further basket 16 between basket 19 and the conveyor belt 67 also results in reducing the distance between the basket unloading axis and the receiving conveyor belt axis, so that the pasta remains intact.

The operation of the machine includes the following dosing and weighing operations. The dosing operation is performed in a sequence of steps shown in FIG. 3-FIG. 11.

Figure 3:
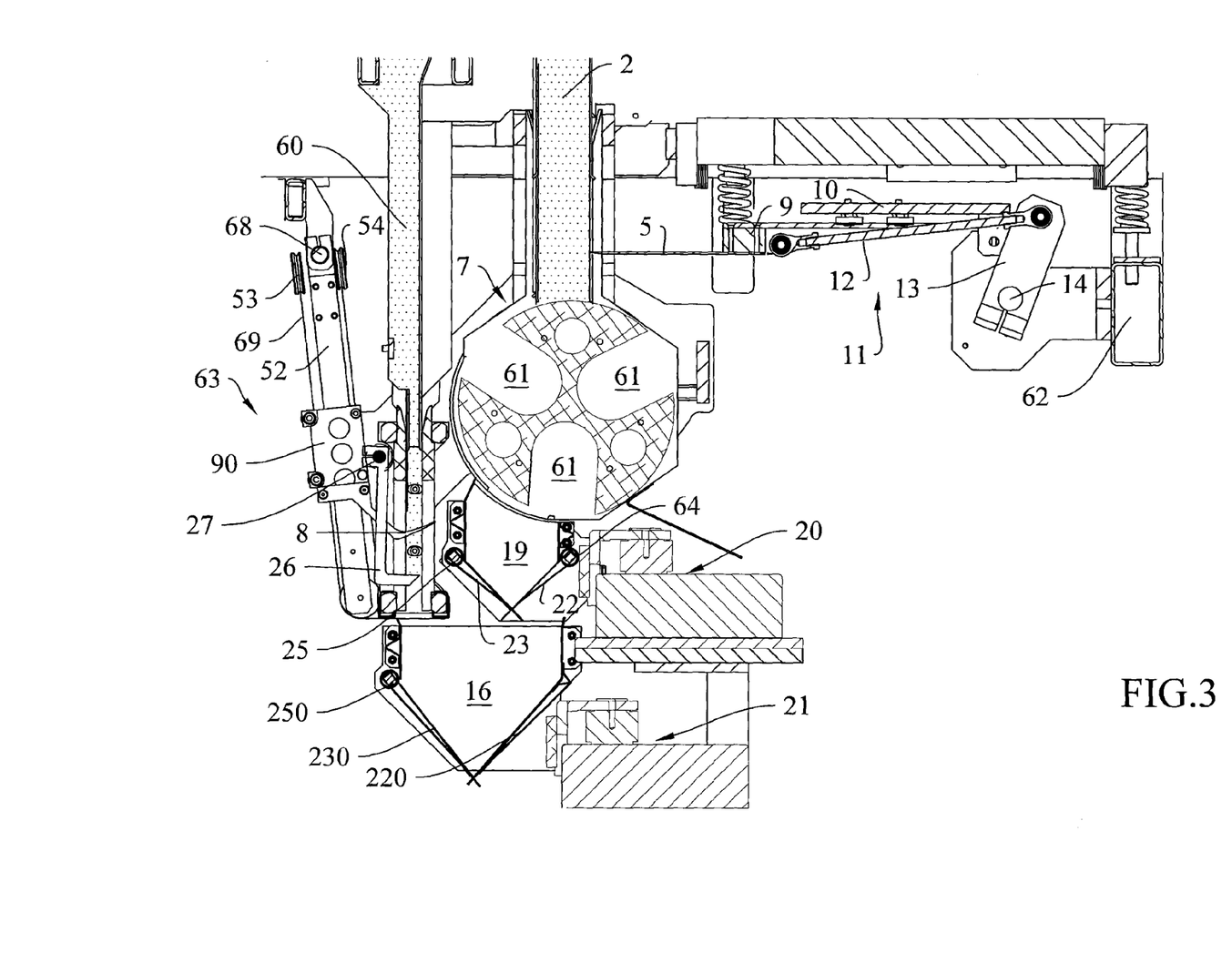
FIG. 3-FIG. 11 show steps of operating the pasta dosing machine in FIG. 1.
Figure 4:
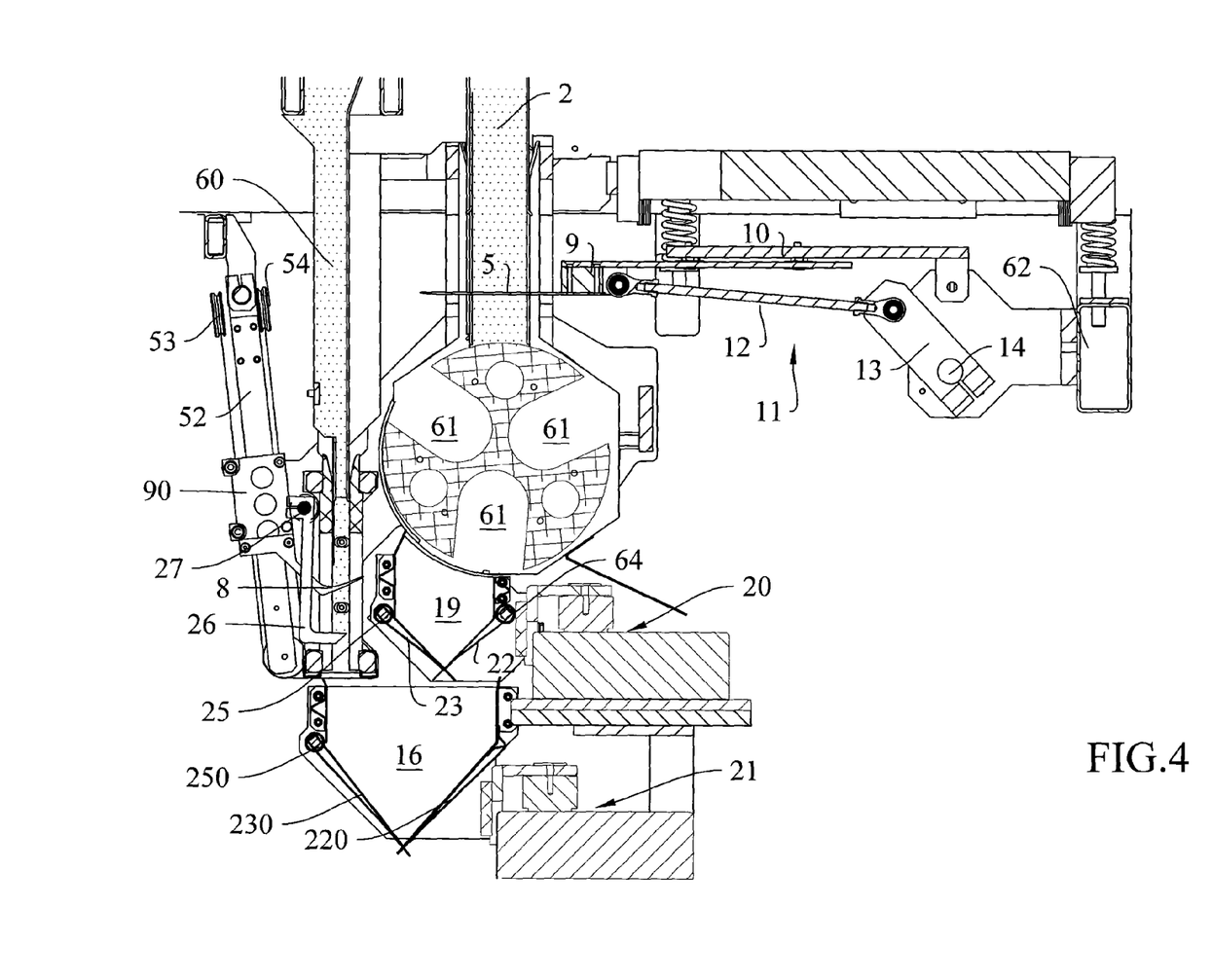

In an initial step, rotor 7 is in a position for supporting the pasta FIG. 3 and there is no radial recess 61 having its concavity facing upwards at the outlet of channel 2; in this step, blade 5 is outside channel 2.

In the next step (FIG. 4), due to the operation of the brushless motor 38, lever 13 rotates anti-clockwise about the other end hinged to pin 14 and results in a leftwards movement of arm 12 so that blade 5 enters channel 2 transversally, thus compressing the pasta contained in the channel 2 itself.

At this point, due to the operation of the brushless motor 18, rotor 7 rotates anti-clockwise and, when it reaches the collection position (FIG. 5), the pasta slides into the corresponding radial recess 61.

Figure 5:
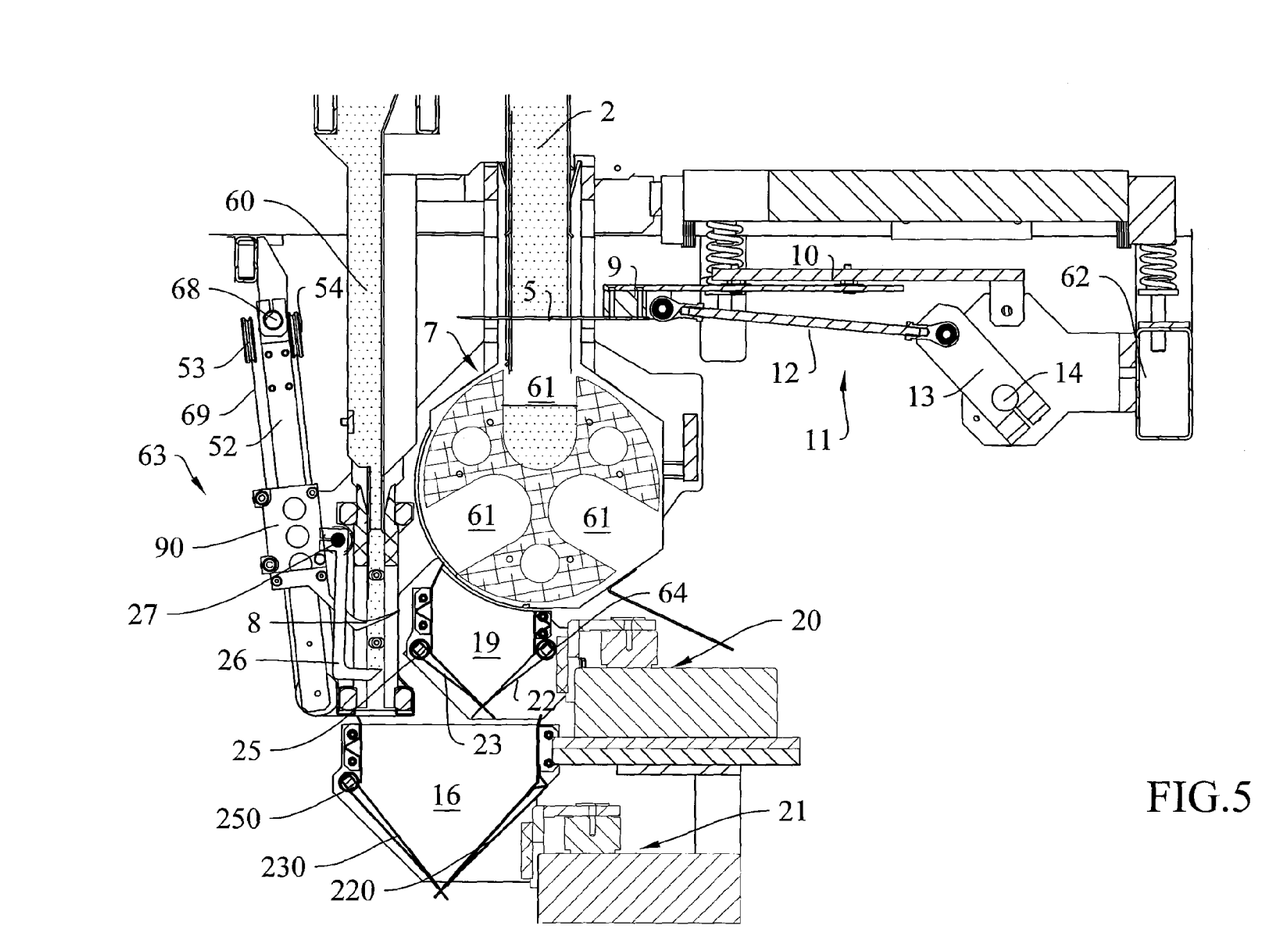
Figure 6:
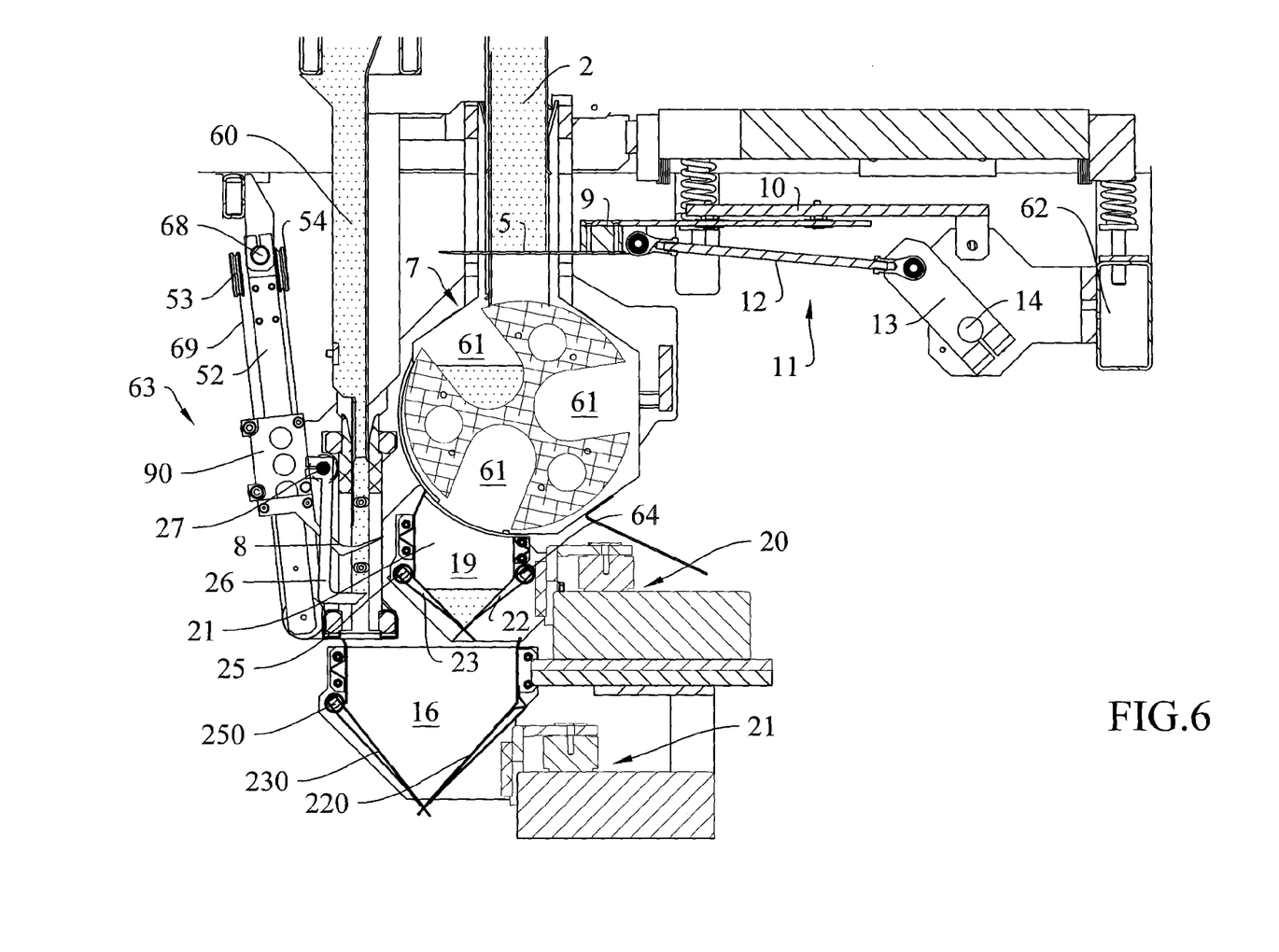

In the next step, with the cylinder rotated by about 205° with respect to the collection position in FIG. 5, the pasta inside rotor 7, which is arranged in an overlapping position orthogonal to the drawing, is unloaded into basket 19 for weighing (FIG. 6).

The presence of several radial recesses 61 on rotor 7 allows the loading and unloading cycle of the pasta dosing to be speeded up.

The weighing operation is performed with the basket being closed and free from engagements with the linkages for opening the doors 22, 23, with said weight measurer 20 arranged at a given distance from basket 19. The weight measurer 20, connected at the top to basket 19, emits an electronic signal corresponding to the weighing being completed, which conveniently operates the fine dosing device 63 associated with the finishing channel 60. In particular, when the pasta is weighed in the roughing channel 2, the weight measurer 20 sends an electronic signal which enables motor 14 to move carriage 90 vertically so as to adjust the position of blade 8 according to the desired amount of pasta.

The fifth motor is then enabled for the pasta dosing operation to occur in the finishing channel 60 and such an amount of pasta is poured into the further basket 16. In particular, the dosing blade 8 is inserted transversally into the finishing channel 60 by moving arm 52 rightwards due to the operation of the motor. When arm 52 moves, the L-shaped blade 26 simultaneously moves leftwards, thereby a small amount of pasta contained in the finishing channel 60 slides into the further basket 16. At a later time, the rightwards movement of arm 52 and the subsequent leftwards movement of the L-shaped blade 26 allow the pasta contained in the finishing channel 60 to fall to the level of the L-shaped blade 26.

Figure 7:
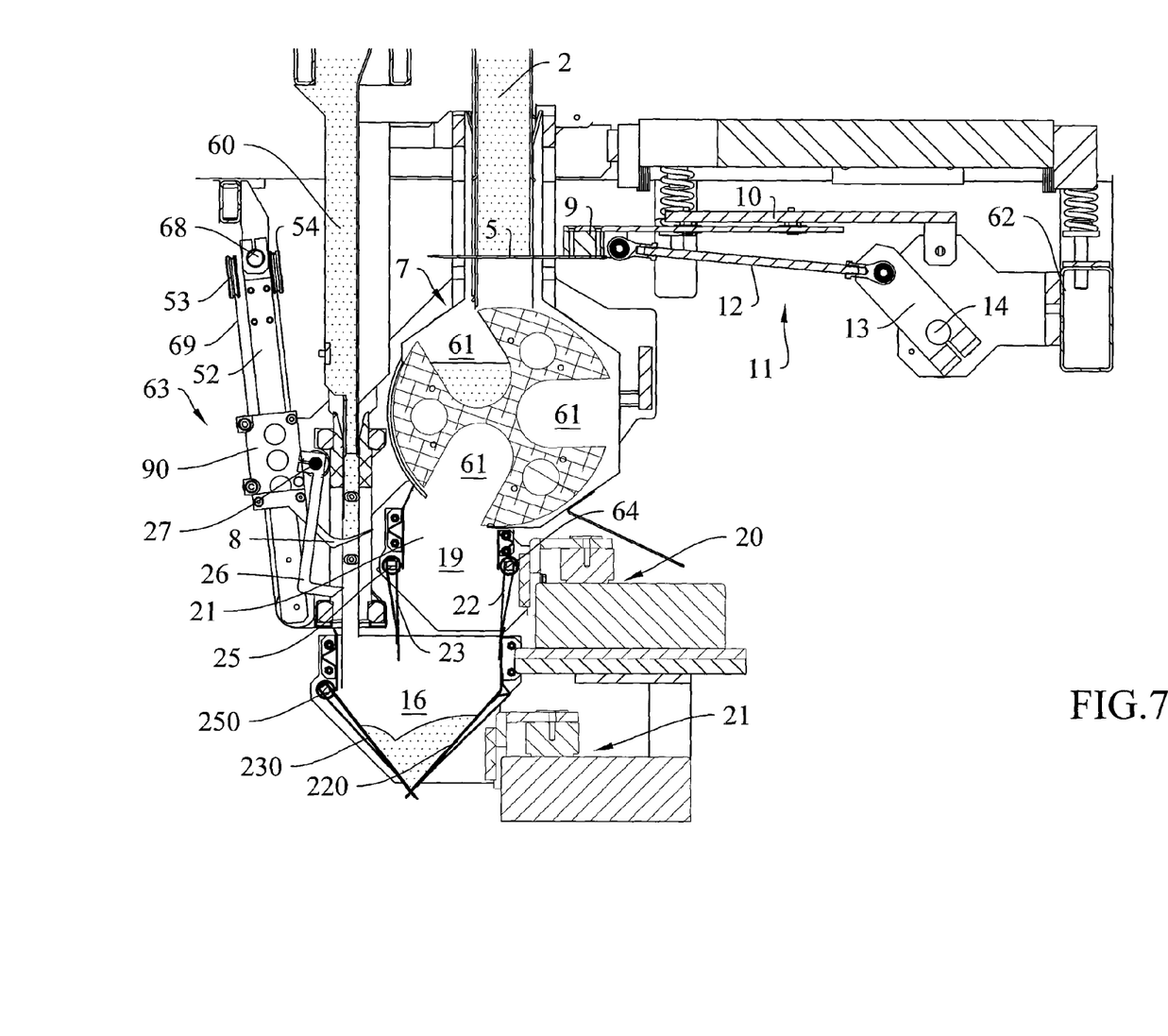
Figure 8:
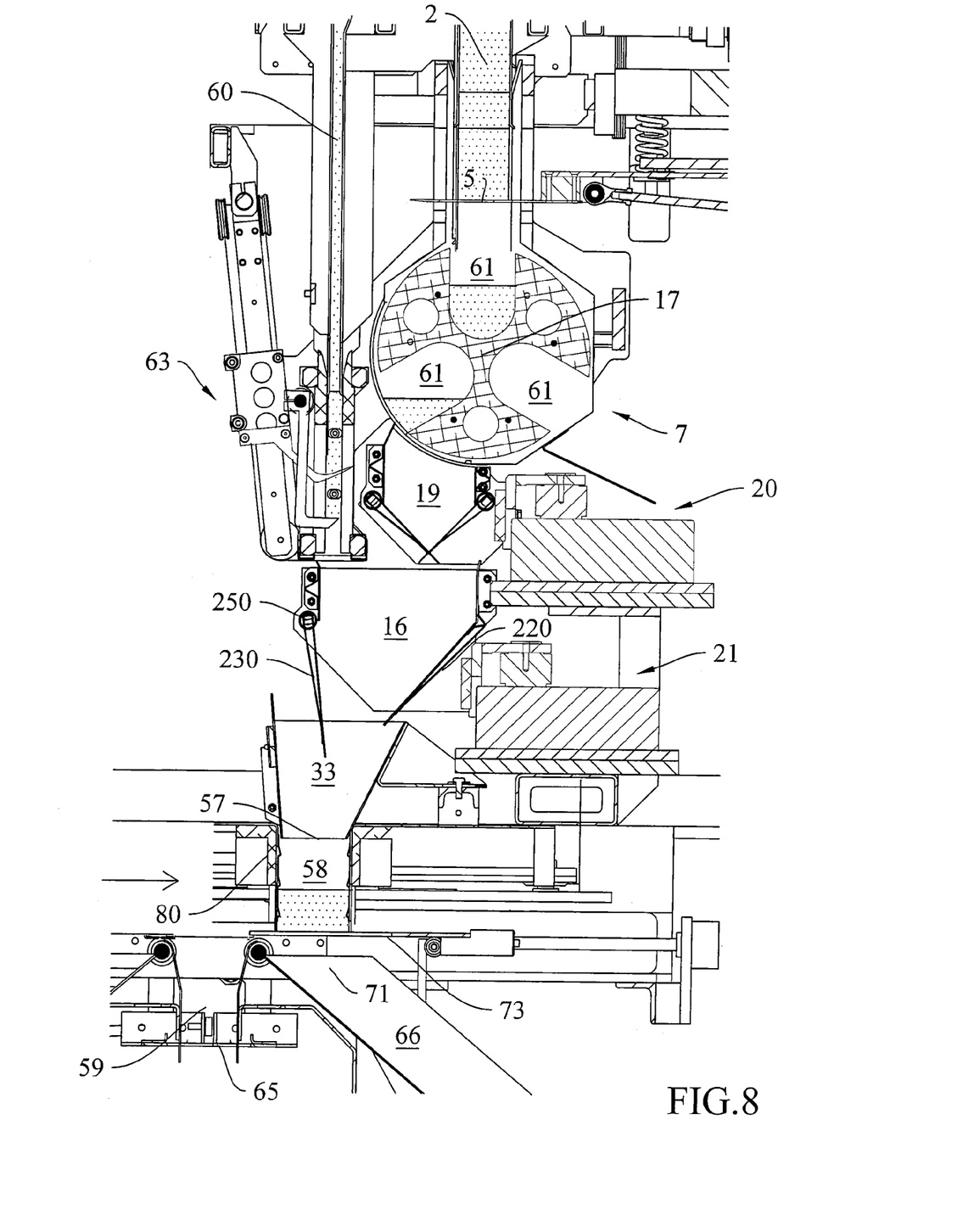
Figure 9:
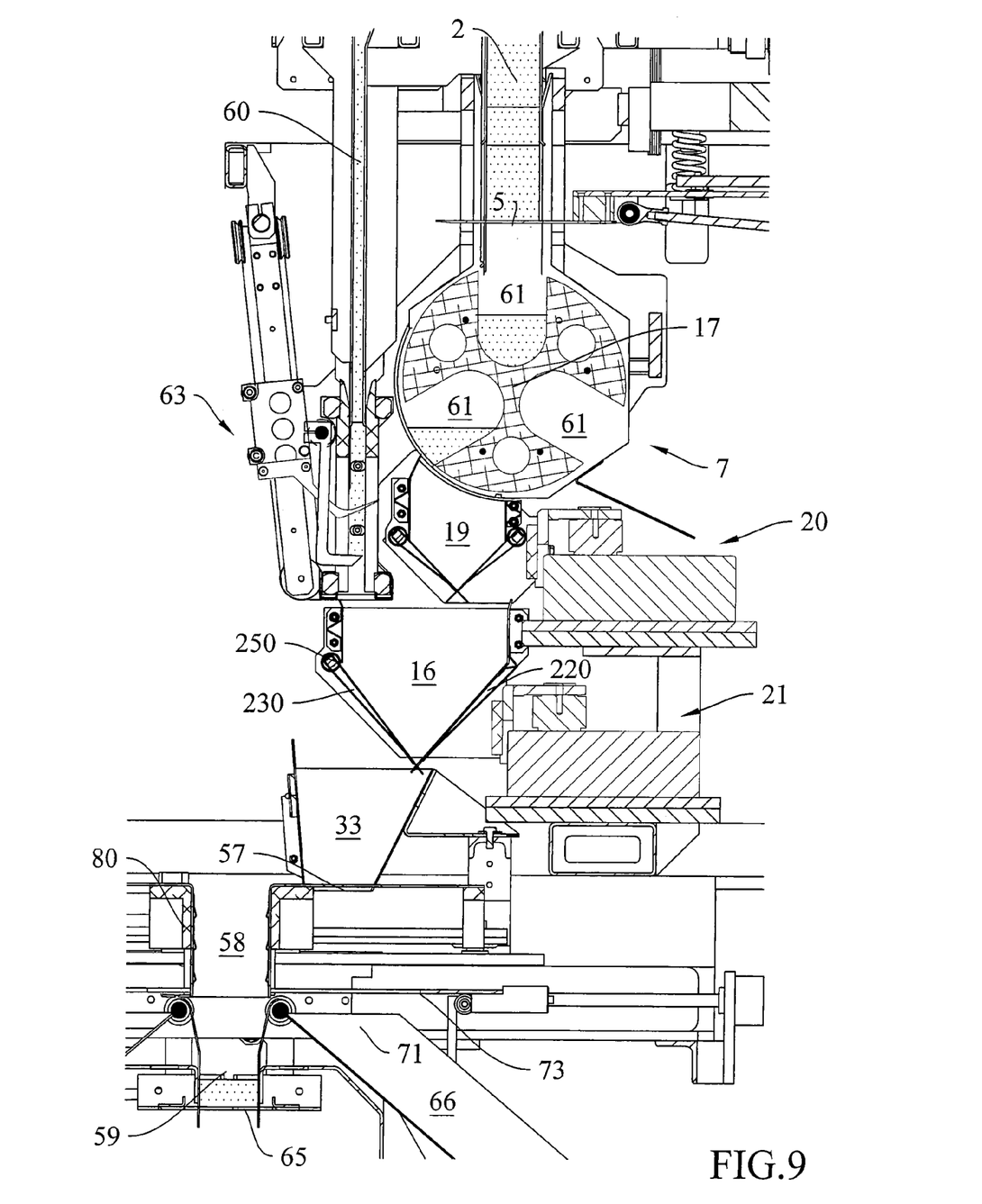
Figure 10:
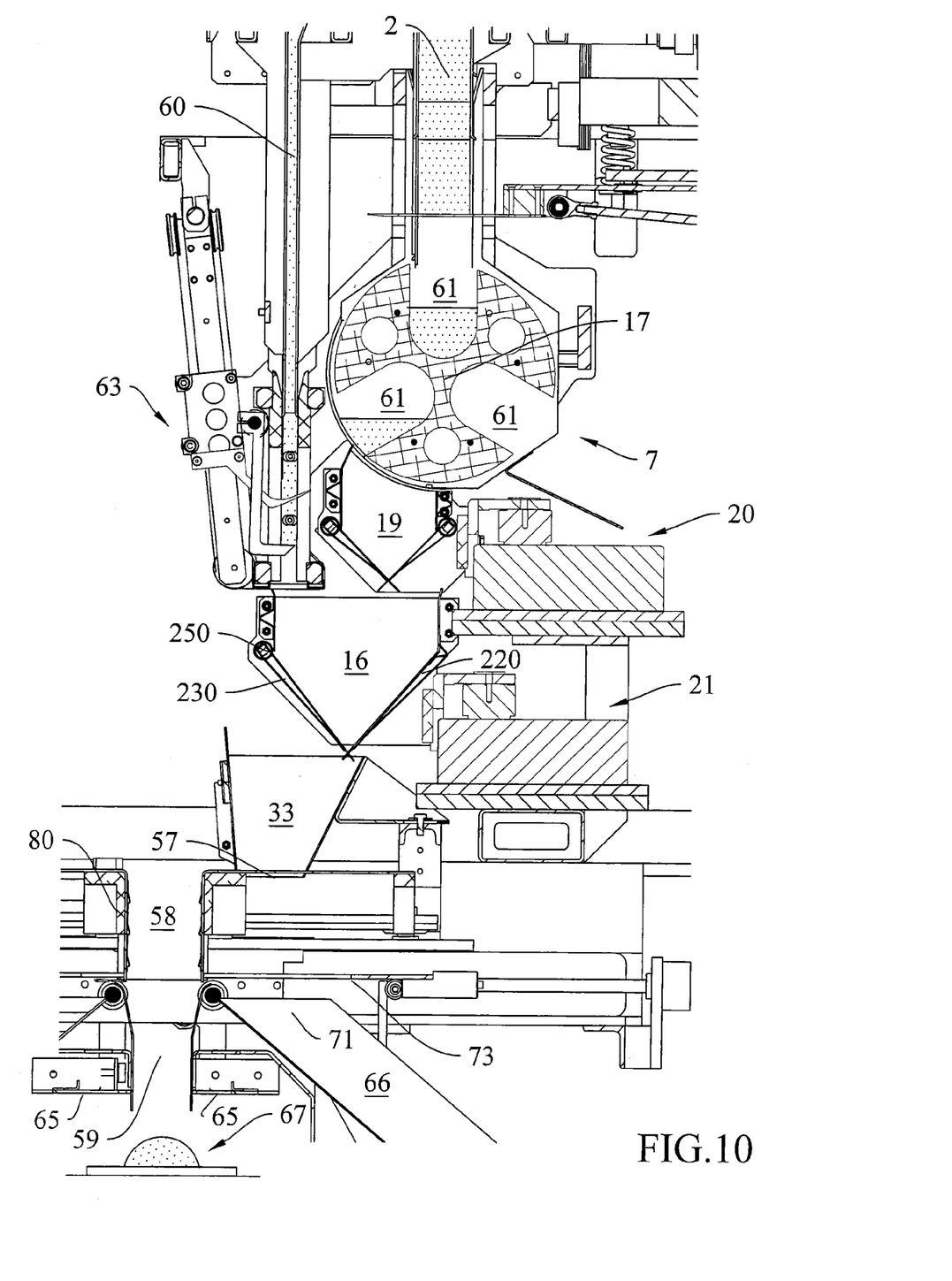
Figure 11:
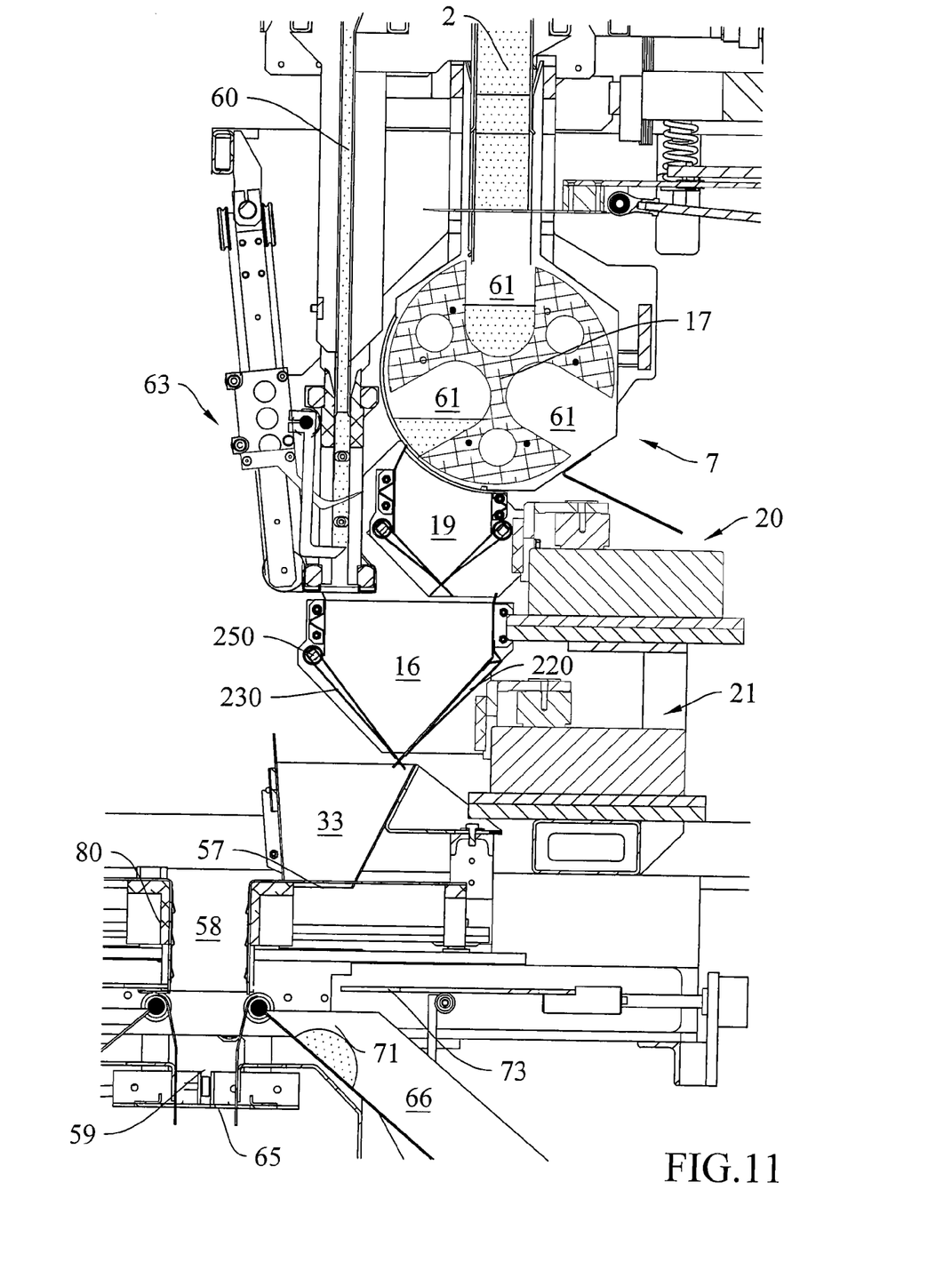

An electronic signal emitted by the weight measurer 20 further causes basket 19 to open due to the operation of the third stepper motor and of the suitable linkage, and more precisely the downwards rotation of door 22 and door 23 is controlled; thereby, the pasta contained in basket 19 falls into the further basket 16, thus being added to the amount of pasta received from the finishing channel 60 (FIG. 7). Basket 19 closes with a closing rotation of doors 22 and 23 due to the operation of the elastic means.

At this point, there is a second weighing operation which is performed by the further weight measurer 21, with the basket being closed and also free from engagements with the opening linkages of door 230. The weight measurer 21, connected at the top to basket 16, emits an electronic signal corresponding to the weighing being completed, which results in controlling the opening of the further basket 16 due to the operation of the sixth stepper motor and of the suitable linkage. More precisely, said electric signal controls the downwards rotation of door 230 so that the pasta contained in basket 16 falls into hopper 33.

If the measurement taken by the weight measurer 21 is that expected (FIG. 8), there is a translation of drawer 80 which slides horizontally thus positioning the passage 58 at the lower opening of hopper 33 to take a first position for collecting the pasta from hopper 33. Once the pasta is collected therein, drawer 80 slides backwards towards a second position for transferring the pasta received into compartment 59. This is the case in which, in this step, plate 73 is in a position for closing the unloading channel 66, thus forming a support surface for the pasta contained in drawer 80.

Figure 12:
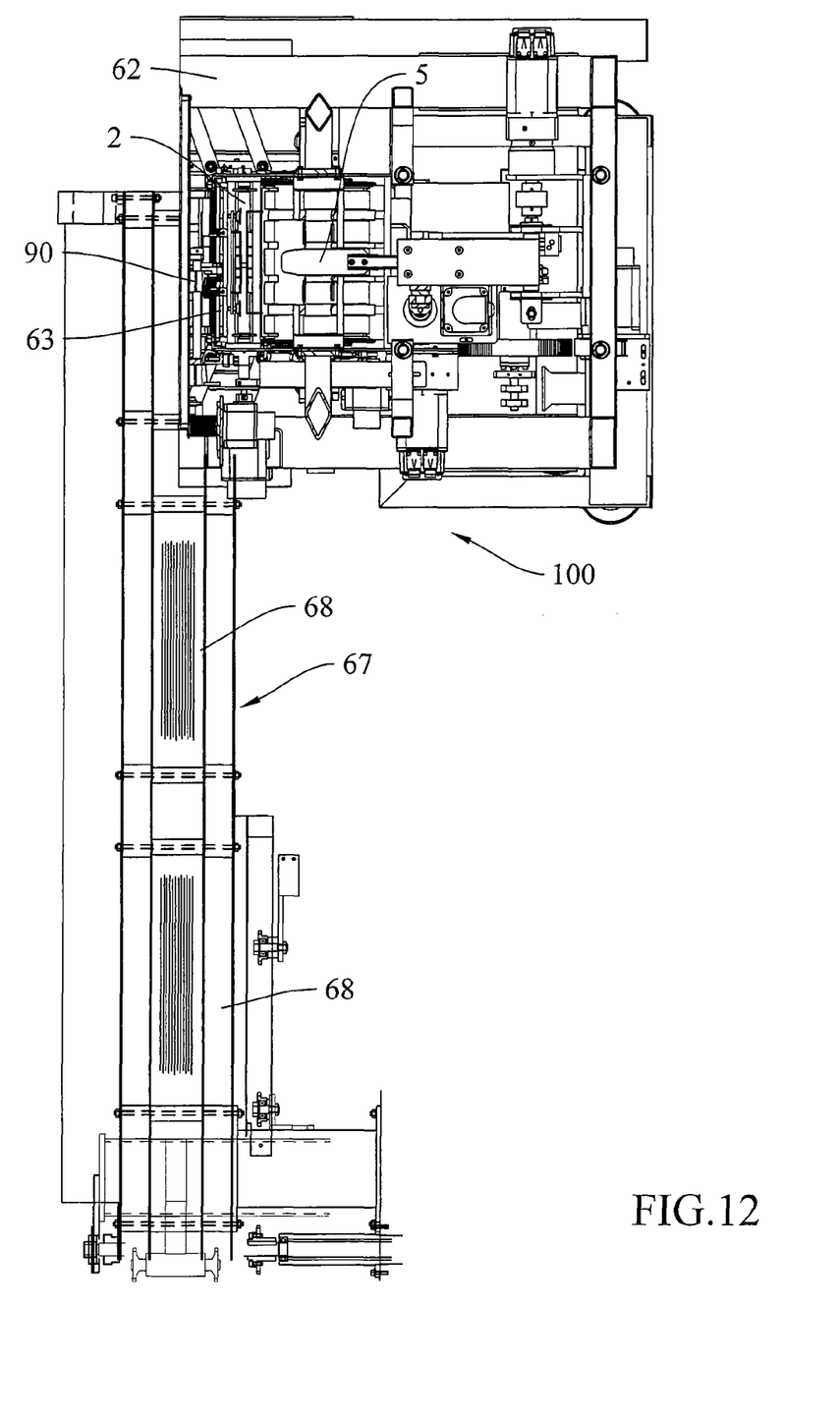
FIG. 12 shows a top view of the pasta dosing machine in FIG. 1.
Figure 13:
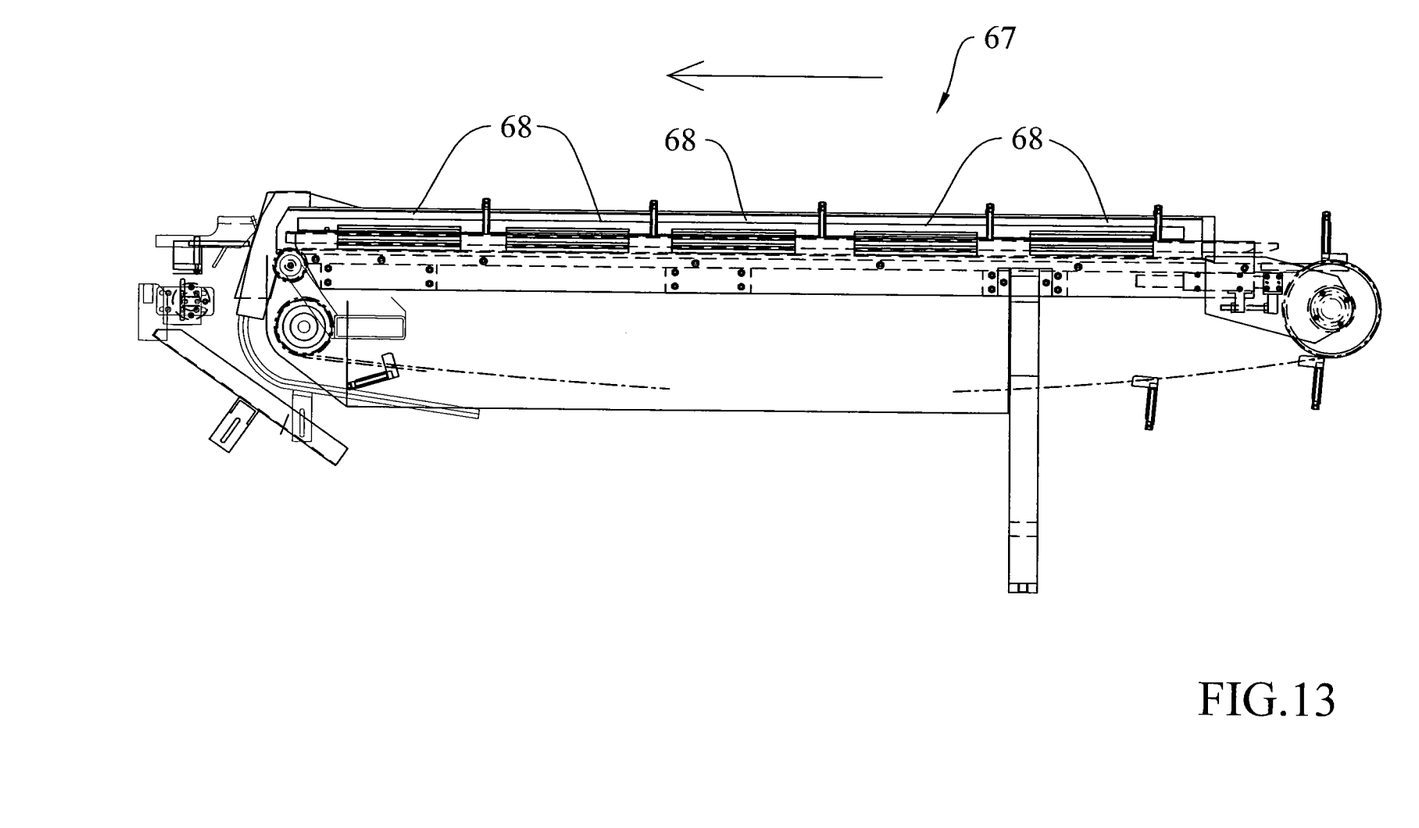
FIG. 13 shows a front view of a conveyor belt cooperating with the pasta dosing machine according to the present invention, for receiving and supporting the pasta doses dispensed each time.

Opening the base 65 of compartment 59 allows the pasta to then fall onto the conveyor belt 67 at a compartment 68, which receives the dose of pasta to guide it to the following packaging steps (FIG. 12-FIG. 13).

In contrast, if the measurement is different from the desired value (FIG. 11), drawer 80 does not slide horizontally. In this case, plate 73 is moved rightwards thus making opening 71 of the unloading channel 66 accessible so that the pasta from hopper 33 falls into the unloading channel 66 to be brought back upstream of the aforesaid processing chain.

Figure 14:
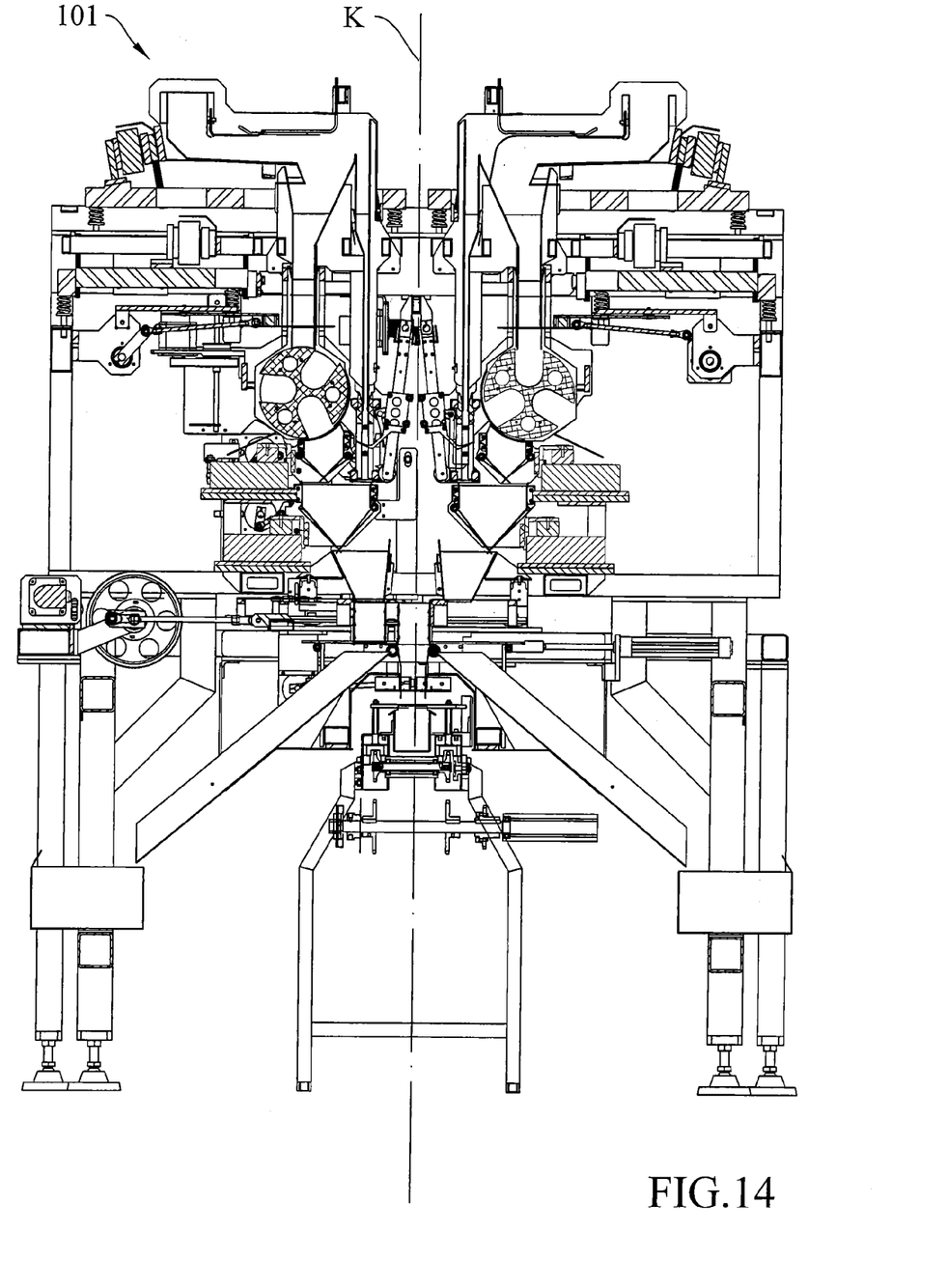
FIG. 14 shows a front view of a pasta dosing machine according to a second embodiment of the present invention.

With reference to FIG. 14, a second embodiment of a dosing machine 101 according to the present invention is shown. Said dosing machine 101 comprises two or more dosing machines 100 according to the first embodiment described above.

In particular, said embodiment of a dosing machine 101 comprises two dosing machines 100 according to the first embodiment, arranged in a mirror image with respect to a plane K. The two dosing machines 100 share the same compartment 59 which guides the desired dose of pasta onto the conveyor belt 67, which is adapted to guide it to the following packaging steps.

Figure 15:
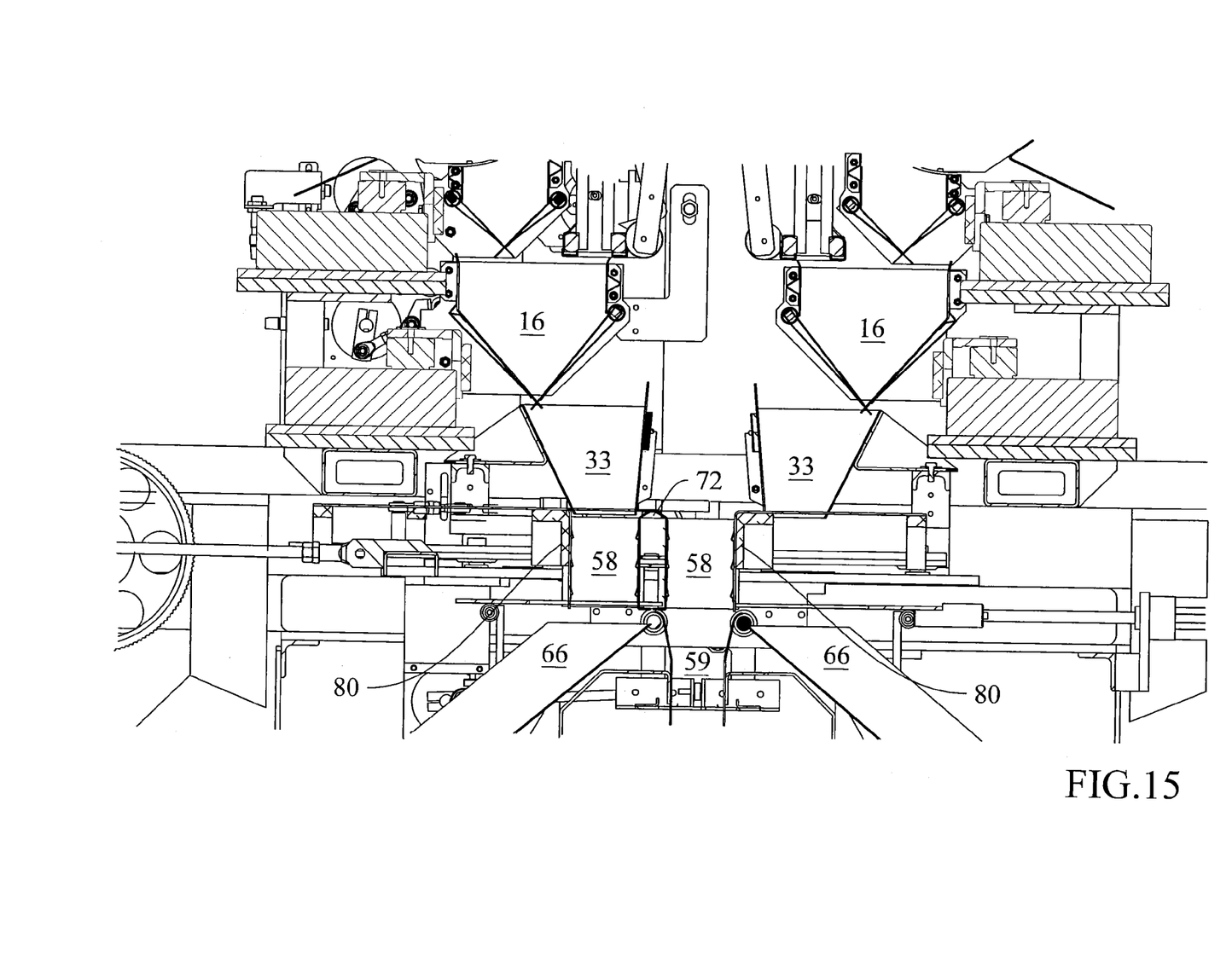
FIG. 15 shows a detail of the pasta dosing machine in FIG. 14.

A pair of drawers 80 with passages 58, separated from each other by means of a wall 72 and each adapted to serve a respective hopper 33, is configured to slide horizontally, advantageously with a travel of 100 mm, and to take a first position for collecting the pasta from hopper 33 and a second position for transferring the pasta received into a compartment 59 as described above.

With the cooperation of several dosing machines 100, there will obviously be an increase in the dosing and weighing speed.

The invention claimed is:

1. A dosing machine for pasta comprising:
    at least one channel for roughing the pasta, provided with first dosing means, a first basket for collecting the dosed pasta and a device adapted to weigh the pasta collected in said first basket,
    at least one channel for finishing the pasta, provided with second dosing means,
    said dosing machine comprising at least one further basket for collecting the pasta unloaded from said first basket and from said finishing channel, and a further device adapted to weigh the pasta collected in said further basket,
    wherein said further device for weighing the pasta is configured to emit an electronic signal corresponding to the weighing being completed, said electronic signal being adapted to control the opening of the further basket to cause the pasta to fall into a hopper having a bottom opening below which a drawer is arranged being configured to slide horizontally, with a short travel of 100 mm, and to take a first position for collecting the pasta from the hopper into a passage and a second position for transferring the pasta from said passage to a compartment provided with an openable base, the dosing machine further comprising a plate configured to aet as support surface for the dose of pasta contained in said passage of the drawer when it is guided towards the compartment, or alternatively, if the dose of pasta is an undesired amount, to translate so as to make an unloading channel having an upper inlet opposite to the lower opening of the hopper accessible.

2. The dosing machine according to claim 1, wherein said openable base is adapted to let the pasta fall vertically onto a conveyor belt which supports a sequence of compartments each adapted to receive a dose of pasta.

3. The dosing machine according to claim 1 wherein said openable base of the compartment comprises a pair of comb-shaped elements configured so as to approach each other with the respective teeth mutually inserted, in a first closed configuration, and so as to move away from each other with the respective teeth not inserted, in a second open configuration.

4. The dosing machine according to claim 1, wherein said first dosing means comprise a rotor with a plurality of radial recesses, said rotor being rotatable between positions of supporting the pasta in said roughing channel and positions of collecting the pasta from said roughing channel to one of said pluralities of radial recesses.

* * * * *